UNITED STATES PATENT OFFICE.

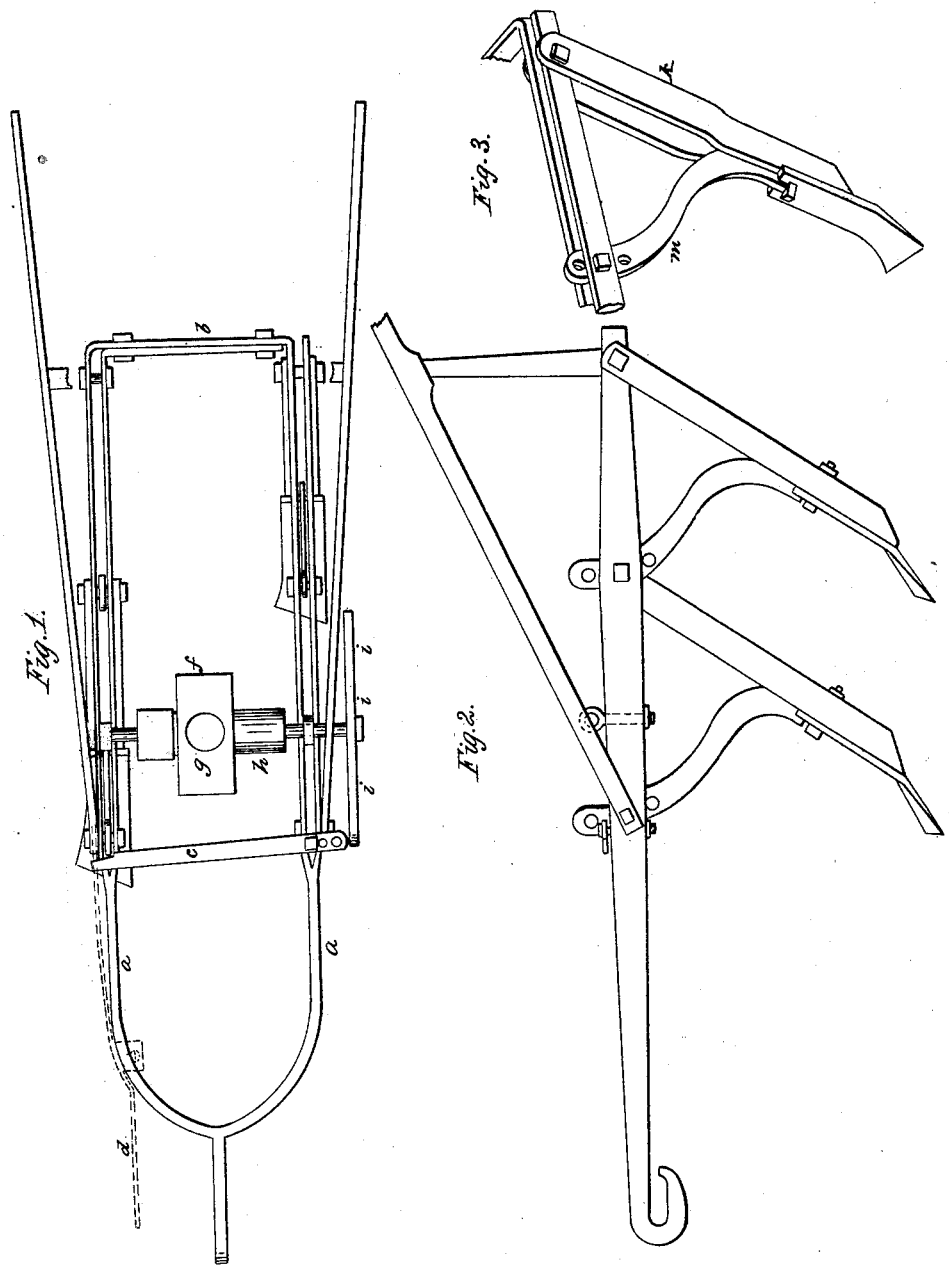

W. C. HOLMES, OF BARNESVILLE, GEORGIA.

IMPROVEMENT IN PLOWS.

Specification forming part of Letters Patent No. 23,580, dated April 12, 1859.

*To all whom it may concern:*

Be it known that I, W. C. HOLMES, of Barnesville, in the county of Pike and State of Georgia, have invented a new and useful Improvement on the Plow-Stock; and I do hereby declare that the following is a full, clear, and exact description of the construction and operation of the same, reference being had to the annexed drawings, making a part of this specification, in which—

Figure 1 is a top view; Fig. 2, a side view; Fig. 3, a detached portion, showing the attachment of the foot to the beam.

To enable others skilled in the art to make and use my invention, I proceed to describe its construction and operation.

I construct my double beam, as seen at $a$, Fig. 1, by bending a piece of iron or steel in the form of the letter U, each prong of which is doubled about two-thirds of its length. The interior limb of each beam is bent at right angles inwardly, as seen at $b$, Fig. 1, forming an adjustable brace by being attached.

$c$ is a cross-brace, serving with brace $b$ to keep the parallelism of the beams.

$d$ is a hook, delineated in red, to be attached when it is wished to change the double into a single stock.

$f$ is an attached seed-dropper, of which $g$ is a block, through which the axle passes.

$h$ is an axle in which there is a receptacle for seed, and $i$ a wheel revolving on the ground and depositing the seed at each revolution.

In Fig. 3, $k$ is a double shank receiving the beam in its opening.

$m$ is a brace passing through the opening of the beam, and being firmly welded in the opening of the shank at the heel.

What I claim as my invention, and desire to secure by Letters Patent, is—

1. The arrangement of the double beams $a\ a$, hook $d$, cross adjustable braces $b$ and $c$, shanks $k$, and braces $m$, the whole being constructed in the manner described, for the purpose specified.

2. In combination with the above, the seed-dropper $f$, constructed for operation conjointly, as set forth.

W. C. HOLMES.

Witnesses:
THOMAS C. DONN,
J. M. BARKER.